United States Patent [19]

Watanabe et al.

[11] 4,447,293
[45] May 8, 1984

[54] SCRAPING BLADES FOR USE IN THIN FILM DRYERS

[75] Inventors: Masaru Watanabe, Fuchu; Satoru Matsumura, Tokyo; Takayoshi Amada, Yokohama; Hiromitsu Irie, Higashimine; Norihisa Saito, Kawasaki, all of Japan

[73] Assignee: Tokyo Shibaura Denki Kabushiki Kaisha, Kanagawa, Japan

[21] Appl. No.: 396,398

[22] Filed: Jul. 8, 1982

Related U.S. Application Data

[63] Continuation-in-part of Ser. No. 194,403, Oct. 6, 1980, abandoned.

[30] Foreign Application Priority Data

Oct. 11, 1979 [JP] Japan ................................. 54-129835
Jul. 23, 1980 [JP] Japan ................................. 55-99850

[51] Int. Cl.³ .......................... B01D 1/24; A47L 13/08
[52] U.S. Cl. ................................. 159/6.2; 159/13 A; 159/DIG. 12; 159/DIG. 15; 15/236 C; 403/408
[58] Field of Search ............... 159/6 W, 6 WH, 13 R, 159/13 A, DIG. 15, DIG. 12; 15/236 C, 246.5; 403/408, 405, 388

[56] References Cited

U.S. PATENT DOCUMENTS 1,584,711   5/1926   Astrom ................................ 403/408
3,054,729   9/1962   Smith ................................. 159/6 W
3,180,398   4/1965   Belcher et al. ..................... 159/6 W
3,271,058   9/1966   Anderson ........................... 403/408
3,416,823  12/1968   Auer .................................. 403/408
4,021,991   5/1977   Hotz ................................... 403/408
4,050,771   9/1977   Watson et al. ...................... 403/408
4,185,352   1/1980   Smith ................................. 15/246.5
4,208,243   6/1980   Knotik et al. ............... 159/DIG. 15
4,208,817   6/1980   Merkel ................................ 403/408
4,238,165  12/1980   Wagner .............................. 403/408

FOREIGN PATENT DOCUMENTS 1283870   8/1972   United Kingdom .

Primary Examiner—Wilbur L. Bascomb, Jr.
Attorney, Agent, or Firm—Stevens, Davis, Miller & Mosher

[57] ABSTRACT

A scraping blade for use in a thin film dryer adapted for processing radioactive substances comprises a main body, a hing member rigidly attached to one side of the body and pivotably connected to a rotor in the dryer, a blade chip attached to the other side of the body for engaging the radioactive substance, and a screw member engaged with the body to secure the blade chip to the body. The blade chip is made of a material more than 1.2 times harder than the radioactive substance. The blade may further comprise an engaging member for screw engagement with the screw having edge portions to be engaged with recesses formed on the blade chip and the main body.

5 Claims, 12 Drawing Figures

HARDNESS OF MATERIAL /
HARDNESS OF WASTE SOLID

SCRAPING BLADES FOR USE IN THIN FILM DRYERS

This application is a continuation-in-part of our co-pending application Ser. No. 194,403 filed Oct. 6, 1980, now abandoned.

BACKGROUND OF THE INVENTION

This invention relates to a scraping blade used in a thin film dryer adapted for processing radioactive waste exhausted from a nuclear power plant or the like.

A thin-film scraping type dryer for chemical use has been widely used for drying radioactive waste exhausted from a nuclear power plant or the like, because the dryer can be easily constructed into a gas-tight device, and maintenance and inspection thereof are also easy.

The thin-film type dryer generally designated at 10 in FIG. 1 is ordinarily constructed as of the vertical type having a rotor 2 rotatable in the dryer 10 when driven by an electric motor 1 provided at the upper portion of the dryer. The cylindrical portion 13 of the dryer 10 includes an inner wall 4 and an outer wall 5 concentric with each other. The space between the two walls 4 and 5 is used as a heating-steam circulating jacket 6 having an inlet port 7 and an outlet port 8 provided at the upper and lower portions of the jacket 6. A number of blades 3 of a special design are arranged around the rotor 2 in an equally spaced apart relation, but in a closely adjacent relation when viewed from a side of the rotor 2. Furthermore, the blades 3 are secured around the rotor 2 in a swingable manner so that the blades 3 are directed radially outwardly by a centrifugal force when the rotor 2 is rotated around its vertical axis.

A radioactive waste exhausted from a nuclear power plant or the like in the form of an aqueous solution is introduced through an inlet port 9 provided at the upper portion of the dryer 10 into a distributor 12. Then the waste solution flows down along the inner wall 4 in the cylindrical portion 13 of the dryer 10 to be subjected to heating, evaporating, and drying processes, successively. More specifically, when the solution passes through a narrow gap between each blade 3 and the inner wall 4, the blade 3 directed radially outwardly by the centrifugal force extends the waste solution over the internal surface of the heat conductive inner wall 4 in the form of a thin film. The solution is thus dried out by the heat conducted through the inner wall 4 into a slurry, and then into solids which are dropped downwardly through a skirt portion 15 into a hopper portion 16 of the dryer 10. The water component of the aqueous solution is discharged through another outlet port 11 also provided at the upper end of the dryer 10 to the outside.

The waste discharged from an atomic power plant or the like contains various chemical compounds, of which hematite $\alpha$-$Fe_2O_3$ shows a Vickers hardness of approximately 500 Hv. To be operated with this compound and also with boron having a comparatively higher hardness and a large grain size, the scraping blades heretofore used are made of stainless steel having a Vickers hardness of approximately 150 Hv. Since the operative edges of the blades 3 are scratched at a high speed of from 8 to 12 m/sec. by the afore-mentioned components and elements contained in the waste while it is dried out on the inner wall 4, the blades 3 are abraded and worn out in a short period, thus requiring replacement after only one hundred hours of usage, for instance.

However, since the interior of the dryer is heavily contaminated by the radioactive waste, the replacement of the blades is extremely difficult. Furthermore, the replacement requires a considerably long period, and therefore the working time of the dryer in cooperation with the plant is much restricted.

Detailed construction of a conventional blade 3 is shown in FIGS. 2, 3 and 4.

The blade 3 comprises a main portion 17, a sharpened edge portion 18 formed outwardly of the main portion 17, and hinges 20 provided inwardly of the main portion 17 as viewed in FIG. 1. Each of the hinges 20 has a hole 19 extending vertically to receive a hinge pin (not shown), so that the blade is swingable horizontally around the hinge pin.

The edge portion 18 of the conventional blade is coated with a nickel-chromium self-fluxing alloy (Colmonoy) by a molten metal spray technique to increase the hardness of the edge portion 18. However, the Vickers hardness of the Colmonoy is approximately 600 Hv. which is comparable with the hardness of a waste solid obtained in the dryer 10. As a result, the operational life of this type of blade could not be much improved over the conventional blades made of stainless steel and having an operational life of approximately one hundred hours.

Moreover, the blade 3 shown in FIG. 3 is relatively weak against the shearing force caused by a centrifugal force in a time when the edge portion 18 of the blade scrapes a thin film of a dryer.

FIG. 4 shows an example in which the main body 17 of the blade and the chip 21 welded to an outer edge portion 18 of the main body 17 by brazing are made of different materials having different degrees of hardness. Inwardly of the main body 17 as viewed in FIG. 1, there are provided hinges 20 having holes for receiving hinge pins (not shown). With this example, as the blade is subjected to a considerably large shearing force caused by a centrifugal force, the blade of the type shown in FIG. 4 cannot sufficiently absorb such shearing stress and the chip merely welded to the main body 17 in likely to be cracked.

SUMMARY OF THE INVENTION

An object of the present invention is to provide a scraping blade to be used in a thin-film type dryer, the operational life of which is far longer than that of the conventional rotor blades.

Another object of this invention is to provide a scraping blade to be used in a thin-film type dryer, the blade having a chip which is firmly secured to the blade body by specific means.

A further object of the present invention is to provide a scraping blade to be used in a thin-film type dryer, wherein the clearance between the blade and the inner wall of the dryer can be maintained at a constant value, and the operability of the dryer can be thereby substantially improved.

According to this invention, there is provided a scraping blade for use in a thin film dryer adapted for processing radioactive substances comprising a body having a longitudinal axis, hinge means rigidly attached to one side of the body for pivoting about an axis parallel to the longitudinal axis of the body, the hinge means being adapted to be pivotably connected to a rotor in a thin film dryer, a blade chip attached to the other side of the body for engaging the radioactive substances to thereby cause them to be extended over a heating surface of the thin film dryer, the blade chip being made of a material more than 1.2 times harder than the radioactive substances which are to be engaged with the blade chip, and screw means engaged with said body to operatively secure said blade chip to the body.

DESCRIPTION OF PREFERRED EMBODIMENTS

Figure 1:
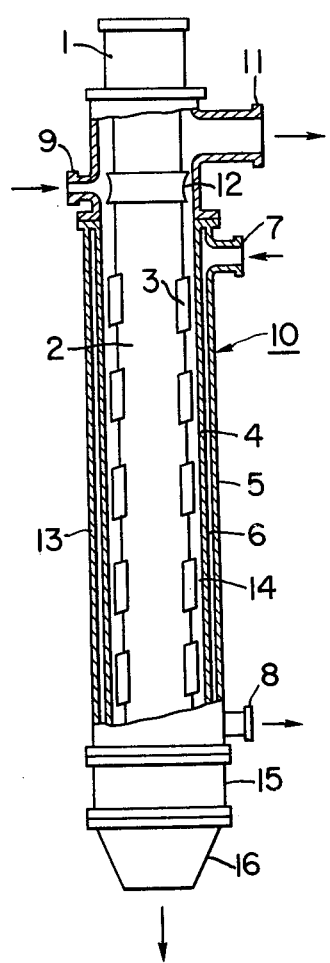
FIG. 1 is an elevational view, partly cut away, of a thin-film type dryer.
Figure 2:
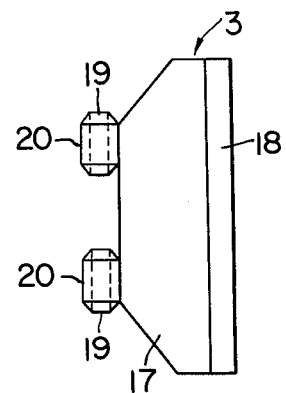
FIGS. 2 and 3 are side view and a plan view, respectively, of a conventional blade used in the dryer.
Figure 3:
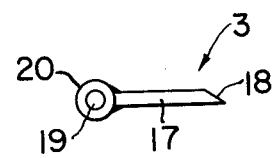
Figure 4:
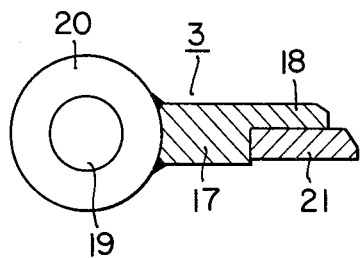
FIG. 4 is a sectional plan view of another example of a blade of prior art.
Figure 5A:
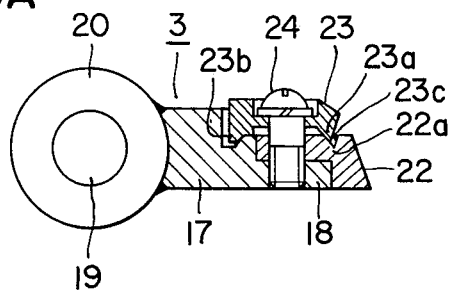
FIG. 5A is a plan view, partly in section of an embodiment of the blade of this invention.

In FIG. 5A, there is indicated an embodiment of the present invention wherein a chip 22 made of a tungsten-carbide alloy is secured to the outer edge portion 18 of the main body 17 by means of a mounting piece 23 and a machine screw 24. The mounting piece has one edge 23a which is in intrusion engagement with a recess 22a provided for the chip 22 and the other edge 23b of which is in engagement with the blade body 17 thereby to ensure the firm engagement between the blade body, the blade chip 22, the mounting piece 23, and the machine screw 24 when the dryer operates. The edge 23a of the mounting piece 23 is engaged with the recess 22a with a small clearance so as to absorb shearing stress caused by a centrifugal force when the blade is rotated. Other parts of the construction such as hinges and others are similar to those shown in FIG. 4 and FIG. 2.

Figure 5B:
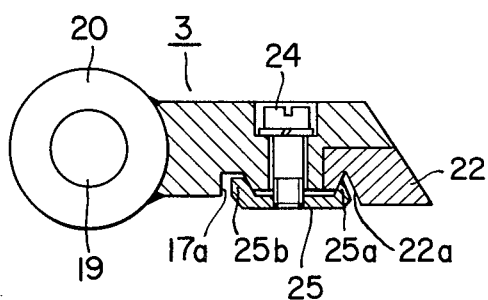
FIG. 5B is a plan view, partially in sectin, of another embodiment of the blade of this invention.

FIG. 5B shows another embodiment of the present invention wherein a blade chip made of a tungsten-carbide alloy is secured to the outer edge of the main body 17 by means of a mounting piece 25. The mounting piece 25 in FIG. 5B is engaged with a machine screw 24 at the lower end portion and provided with sharp edges 25a and 25b which are to be engaged with recesses 22a and 17a of the blade chip 22 and the main body 17, respectively. The machine screw 24 is engaged with the main body 17 with a slight clearance to absorb shearing stress caused by a centrifugal force in a time when the blade chip 22 scrapes a thin film of a dryer.

Figure 5C:
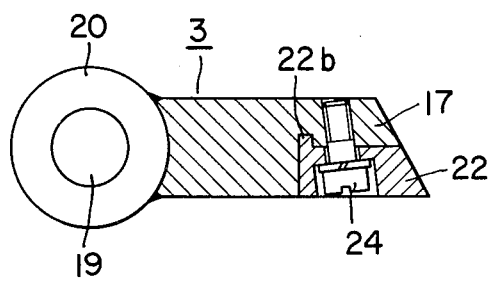
FIG. 5C is also a plan view of a further embodiment of the blade of this invention.

FIG. 5C shows a further embodiment of the present invention in which a blade chip 22 made of a tungsten-carbide alloy is secured to the outer edge of the main body 17 of a blade 3 by a screw means 24 which is screwed in a slightly inclined manner to firmly secure the chip 22 to the main body 17. The blade chip 22 shown in FIG. 5C is provided with a projection 22b to engage with a corresponding recess formed to the main body 17 of the blade. Although this example may have slightly low capability of absorbing shearing stress caused by centrifugal force when the dryer operates as compared with the embodiments shown in FIGS. 5A and 5B, this embodiment has a simple construction and is not expensive.

Figure 5D:
FIG. 5D shows one modification of the blade chip according to this invention.

The blade chip 22 shown in FIG. 5A, 5B, or 5C may be provided with a front end portion 30, as shown in FIG. 5D, made of such as a tungsten-carbide alloy by welding or brazing, for example, and in this case the other portion of the blade chip 22 can be made of a suitable material other than tungsten-carbide alloy.

The reason why the tungsten-carbide alloy is used for the chips 21 and 22 of the aforementioned embodiments is as follows.

Figure 6:
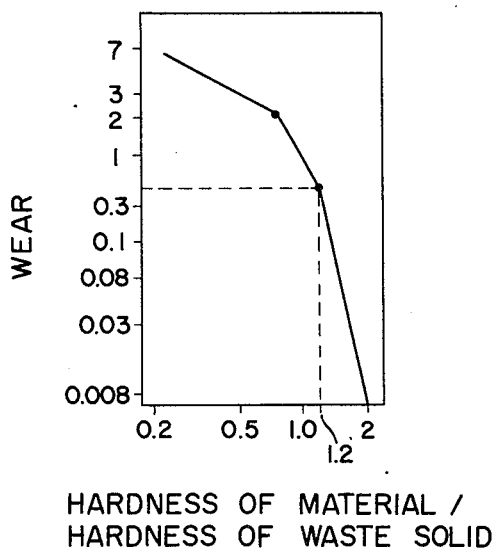
FIG. 6 is a graphical representation of the wear of the blade against hardness ratio of the blade material to the waste solid dried out in the dryer.

As will be apparent from FIG. 6 showing a relation between the wear of the blade and the hardness ratio of the blade material to a solid component in the waste (hereinafter termed waste solid) obtained in the dryer, a blade having an edge portion sprayed with a molten metal somewhat harder than the waste solid, such as Colmonoy, is easily worn out, whereas a blade having a chip made of a material more than 1.2 times harder than the waste solid on its edge portion exhibits abrasion or wear far smaller than that of the blades sprayed with the Colmonoy or the like. Hardness of the tungsten-carbide alloy is 1200 Hv. which is more than 1.2 times harder than that of $\alpha$-$Fe_2O_3$ powder which is approximately 500 Hv. Thus, by brazing the chip 21 or securing the chip 22 both made of tungsten-carbide alloy to the edge portion 18 as in the aforementioned embodiments, the abrasion or wear of this part can be substantially reduced.

Figure 7:
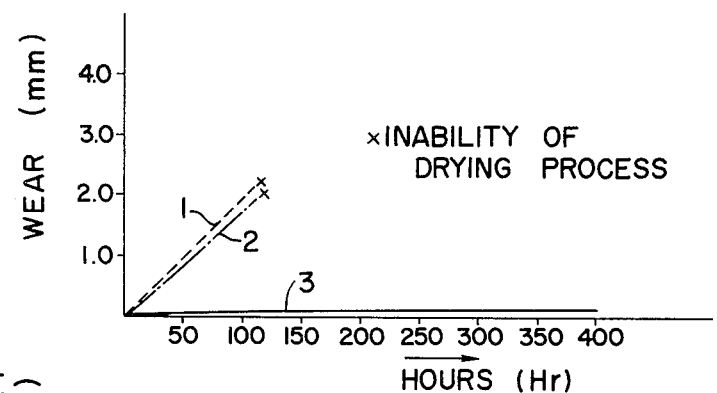
FIG. 7 is a graphical representation of wear-operational life characteristics of the blade made of different kinds of materials.

Experiments were carried out for blades made of various materials, while the dryer is supplied with a waste simulating material consisting of 25 wt.% of $Na_2SO_4$, a certain wt.% of $\alpha$-$Fe_2O_3$ or like solid and the remainder of water, and the results shown in FIG. 7 were obtained. In the experimental results, a broken line 1 corresponds to a case where the entire blade is made of a stainless steel SUS 316, a dot and dash line 2 corresponds to a case wherein Colmonoy is sprayed onto the edge portion of the blade, and a solid line 3 corresponds to a case where a tungsten-carbide chip is secured to the edge portion of each blade.

As will be apparent from FIG. 7, when used with the waste simulating material containing $\alpha$-$Fe_2O_3$ in powdered state, the blades utilizing SUS 316 and Colmonoy were severely worn out after about 100 hours of usage to an extent that the blades cannot be used further, while the blades having a tungsten-carbide chip were found satisfactory after usage for the same period without losing its initial operability.

According to the present invention, various advantageous features can be obtained other than the above described wear reduction of the blades.

Figure 8:
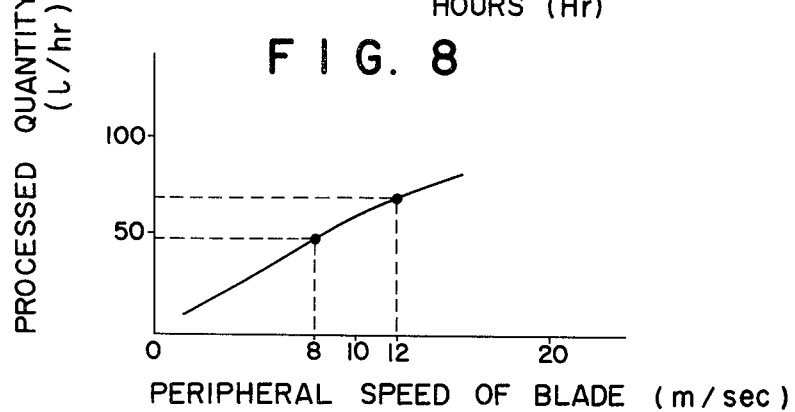
FIG. 8 is a graph showing a variation of the output of the thin-film type dryer depending on the peripheral speed of the blade held at a constant distance from an inner heating surface of the dryer.

For instance, the output of the dryer can be increased by increasing the peripheral speed of the blades as shown in FIG. 8, which is made possible according to the present invention by the use of the blade comprising a main body and a chip which is firmly engaged therewith in the specific manner as described hereinbefore and the use of an alloy having a hardness more than 1.2 times that of the waste solid without reducing the operational life of the blades.

Furthermore, the blade or blade chip attached in the conventional manner has less resistance against the shearing stress caused by the centrifugal force when the dryer in operated and where the conventional blades made of stainless steel or having the edge portion coated with Colmonoy or the like are used in the dryer, the blades have been worn out differently in regions of the dryer where the blades are brought into contact with a liquid phase, a slurry phase, and a solid phase of the waste, thus causing the replacing time intervals of the blades to be different for respective regions.

Since it is not desirous to frequently replace the blades in the radioactive waste processing dryer each time the individual blades are worn out, the entire blades must be replaced simultaneously upon elapse of a time interval shorter than the minimum operational life which usually occurs in the blades contacting with the slurry phase. Thus, the replacing period of the blades has been shortened, and the economical use of the blades has been impossible.

By the use of the blades utilizing an alloy having a hardness more than 1.2 times that of the waste solid on the outer edge portion of the blade, the above described shortcoming of the blade being worn differently in respective regions in the dryer can be substantially eliminated, and the clearance between the blade chip and the internal surface of the inner wall can be held at a constant value for a long period. In addition, according to the present invention, the replacement and the adjustment of the blades can be much simplified.

Figure 9:
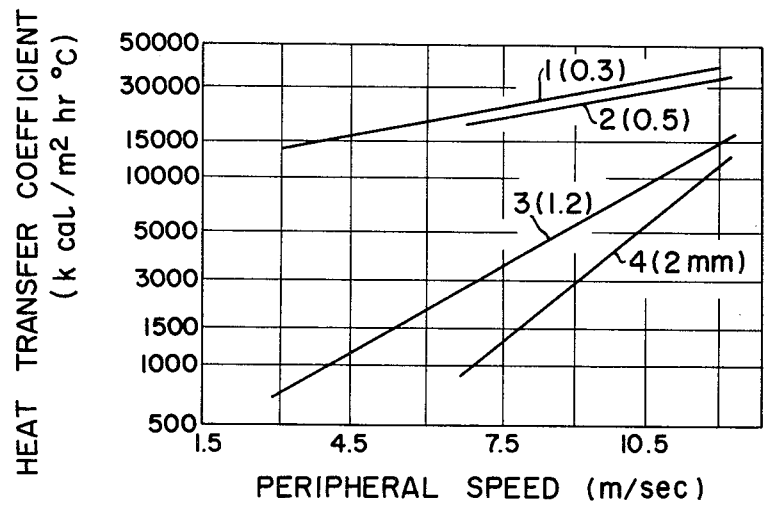
FIG. 9 is a graphical representation showing relations between heat transfer coefficient of the heating surface and the peripheral speed of the blade, with the clearance between the blade and the surface being utilized as a parameter.

In FIG. 9 showing relations between the heat transfer coefficient of the dryer and the peripheral speed of the blade utilizing the clearance between the chip of the blade and the inner wall as a parameter, lines 1 through 4 represent those cases wherein clearances of 0.3, 0.5, 1.2, and 2 mm are maintained between the blade and the inner wall, respectively.

As will be apparent from FIG. 9, when the clearance is maintained at a constant value, the heat transfer coefficient of the inner wall of the dryer increases in accordance with an increase in the peripheral speed of the blades, and the output quantity of the dryer can be increased in a similar manner as in the case of FIG. 8.

With a clearance in a range of 0.3 to 0.5 mm, the heat transfer coefficient through the inner wall is comparatively high. However, when the clearance increases into a range of 1.2 to 2 mm., the heat transfer coefficient decreases substantially, thus reducing the processed quantity in the dryer.

From the above description with reference to FIG. 9, it has been made apparent that the clearance between the tip of the blade and the inner wall, and hence the wear of the blade, has a substantial effect upon the output of the dryer. By the use of the tungsten-carbide chip for the outer edge portion of the blades, the wear or abrasion of the blades is substantially reduced, and the output quantity of the dryer can be remarkably increased.

Furthermore, since the clearances for the blades are held at a constant value, the loads applied to the blades can be equalized, and vibrations and noises generated in the dryer can be substantially reduced.

As can be understood from FIGS. 5A and 5B, according to the present invention, a mounting piece secured to a machine screw engaged with a blade body has sharp edges which are to be firmly engaged with the recesses provided for the blade body and the blade chip, respectively, so that it is possible to prevent the blade chip from being left away by a centrifugal force caused when the blade rotates and also prevent direct application of a shearing stress on the machine screw. In addition, the blade chip can easily be removed or exchanged by slightly loosening the screw.

Although in the above described embodiments, a tungsten-carbide chip has been used for the outer edge portion of each blade, it is apparent that any other material than tungsten-carbide having a hardness more than 1.2 times that of the solid in the waste can be used within the scope of the present invention. For instance, titanium nitride, silicon nitride, alumina base cermet, boron carbide, and like material having extremely high hardnesses and excellent workability can be used for the chip secured to the outer edge portion of each blade.

It is to be understood by those skilled in the art that the foregoing description refers to some preferred embodiments of this invention and that various modifications and changes may be made without departing from the true scope and spirit of the invention as defined in the appended claims.

We claim:

1. A scraping blade for use in a thin film dryer adapted for processing a radioactive substance comprising:
    a body having a longitudinal axis and provided with a recess on its outer surface, said body recess having first and second sidewalls;
    hinge means rigidly attached to one side of said body for pivoting about an axis parallel to the longitudinal axis of said body, said hinge means being adapted to be pivotably connected to a rotor in a thin film dryer;
    a blade chip attached to the other side of said body for engaging the radioactive substance to thereby cause it to be extended over a heating surface of the thin film dryer, said blade chip being provided with a recess on its outer surface, said blade chip recess having first and second sidewalls;
    screw means engaged with said body to operatively secure said blade chip to said body; and
    means for engagement with said screw means, said engagement means having two sides and edge portions on both said sides which are respectively engaged with one of said sidewalls of said body recess and one of said sidewalls of said blade chip recess with a clearance being provided between said edge portions and the other of said sidewalls of said body recess and the other of said sidewalls of said blade chip recess.

2. The scraping blade according to claim 1 wherein said blade chip is formed from a wear resistant alloy selected from a group consisting of tungsten-carbide, titanium nitride, silicon nitride, alumina base cermet, and boron carbide.

3. The scraping blade according to claim 1 wherein said radioactive substance is hermatite $\alpha$-$Fe_2O_3$.

4. The scraping blade according to claim 1, wherein said blade chip is made of a material more than 1.2 times harder than the radioactive substance with which said blade chip is to engage.

5. The scraping blade according to claim 1, wherein said edge portions are tapered and said one sidewall of said body recess and said one sidewall of said blade chip recess have a taper complementary to that of said edge portions.

* * * * *